United States Patent [19]

Ching

[11] Patent Number: 4,503,180

[45] Date of Patent: Mar. 5, 1985

[54] UV-STABILIZED RESINS

[75] Inventor: Ta-Yen Ching, Walnut Creek, Calif.

[73] Assignee: General Electric Company, Schenectady, N.Y.

[21] Appl. No.: 387,107

[22] Filed: Jun. 10, 1982

Related U.S. Application Data

[63] Continuation-in-part of Ser. No. 234,228, Feb. 13, 1981, abandoned.

[51] Int. Cl.$^3$ ............................................. C08K 5/10
[52] U.S. Cl. ................................... 524/293; 428/412; 524/335
[58] Field of Search ............... 524/293, 335; 560/109; 568/333; 428/412

[56] References Cited

U.S. PATENT DOCUMENTS

| | | | |
|---|---|---|---|
| 2,704,749 | 3/1955 | Wood et al. | 260/45.85 R |
| 2,905,556 | 9/1959 | Fuchsman et al. | 260/45.85 R |
| 2,952,311 | 4/1960 | Meyer et al. | 260/45.85 R |
| 2,983,709 | 5/1961 | Newland et al. | 260/45.85 R |
| 3,445,423 | 5/1969 | Sunshine et al. | 260/45.85 R |
| 3,582,398 | 6/1971 | Ringler | 428/412 |
| 4,021,405 | 3/1977 | Tucker et al. | 428/412 |
| 4,103,065 | 7/1978 | Gagnon | 428/412 |

OTHER PUBLICATIONS

Ranby et al., *Photodegradation, Photo-Oxidation and Photostabilization of Polymers,* (1975), pp. 369-374 and 392, John Wiley and Sons, Inc.
Ranby et al.-ibid, p. 387.
Chemical Abstracts, 61, 4303c, (1964), Mizukami et al.

*Primary Examiner*—Veronica P. Hoke
*Attorney, Agent, or Firm*—William H. Pittman; James C. Davis, Jr.; James Magee, Jr.

[57] ABSTRACT

Polycarbonate resins can be stabilized against the adverse influence of UV light by incorporating an effective amount of a methyl benzoate ester stabilizer by means of a coating on the surface of the resin.

9 Claims, No Drawings

UV-STABILIZED RESINS

This application is a continuation-in-part of application Ser. No. 234,228, filed Feb. 13, 1981, now abandoned, and assigned to the same assignee as the present invention.

This invention is concerned with stabilized polycarbonate compositions comprising a resinous carrier surface coating in admixture with an effective amount of a latent stabilizer (hereinafter so designated) of the formula

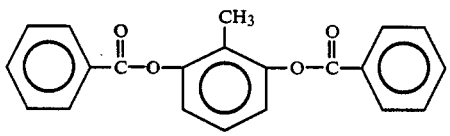

which stabilizer is applied as a coating on the surface of said polycarbonate resin.

Polycarbonate polymers are excellent molding materials since products made therefrom have high impact strength, toughness, high transparency, wide temperature limits, and good dimensional stability. In particular, polycarbonate resins in the form of film or sheet materials in varying thicknesses, for instance, as protective film or for glazing purposes, have been extensively used because of the foregoing properties inherent in the polycarbonate resin. However, such polycarbonate resins are deficient in their ability to resist the effects of UV light which causes the polycarbonate resin to become colored and yellow under the continuing influence of UV light. Various UV stabilizers have been used in combination with polycarbonate resins to reduce the effect of coloring induced by UV light with varying success. One of the problems of using usual UV stabilizers is that when they are incorporated in polycarbonate resins, they are often unable to prevent yellowing of the polycarbonate resin being subjected to UV light for extended periods of time.

It has been known in the past that resorcinol monobenzoate (which is manufactured by Kodak and identified as RMB) is a UV screen for resins and has low UV absorption in the range of 250–400 nm. This RMB undergoes a chemical rearrangement to 2,4-dihydroxybenzophenone. Although this delayed generation of a UV screen by irradiation has made RMB a well known additive for polymers requiring both UV cure and long-term UV stability, there is much to be desired for the degree of UV resistance generation for the UV stabilizer after the carrier resin with the UV stabilizer therein has been cured. Furthermore, it is found that large amounts are required in the coating composition to provide adequate stabilization.

The use of my latent stabilizer where there is a methyl group interposed between the hydroxy group and the ester portion of the benzoate not only functions as well as, for instance the RMB, but has other advantages as, for instance, much smaller amounts of the latent methyl derivatives are usually required, and after the carrier resin has been cured, the methyl UV stabilizer can then exert its effect of photo stabilization. The degree of such stabilization is improved in a matter of kind over, for instance, the RMB which is widely used in the industry. This will be clearly apparent from the examples which follow and the table which illustrate the rate of UV generation accomplished by means of the simple presence of the methyl group in the position where it is located, as shown in formula I.

The term "latent UV stabilizer" as herein used is intended to mean composition I, which when applied to the surface of the polycarbonate resin, under the influence of UV light is converted by chemical rearrangement to a composition which is the actual stabilizer and does not begin to exert UV stabilization of the polycarbonate resin until first the carrier resin for the UV stabilizer is allowed by the action of UV light, to cure to the insoluble state and in the process the UV stabilizer does not interfere (does not stop the passage of the UV light) with the UV curing of the carrier resin. Thereafter, after a period of time varying as much as 200–400 hours, after the carrier resin for the UV stabilizer has been cured, e.g., by UV light or at temperatures ranging from about 100°–200° C., the latent UV stabilizer then comes into action so that as time progresses, the latent UV stabilizer rearranges in the cured coating on the surface of the polycarbonate resin and then begins to exert its influence as a UV stabilizer and exerts a resistance to yellowing, even after many hundreds of hours of being subjected to a UV source whether it be artificial or the sun.

It is important that the latent stabilizer does not interfere with the curing of the carrier resin on the surface of the polycarbonate resin because if the latent UV stabilizer immediately begins to act as a stabilizer, it will filter out the UV light and will prevent UV curing of the carrier resin. To the best of the applicant's knowledge, no one in the past has recognized the fact that it is possible, by having the methyl group in the dibenzoate of formula I in the position therein, the stabilizer gives more effective UV screening than when the methyl group is absent (assuming the UV stabilizer is already in the rearranged state). This delayed latent stabilizing action is important in order to take advantage of the UV stabilizing effect of the latent stabilizer later while at the same time permitting the carrier resin on the surface of the polycarbonate to harden and cure, especially if UV cure is used, so as to provide a surface of increased hardness and resistance to marring and scratching of the surface of the polycarbonate resin, which heretofore has presented problems in these areas in numerous applications.

It is also essential that the methyl group be on the phenyl nucleus in the position shown as illustrated in formula I in order to obtain the distinct advantages in kind found for the stabilizer of formula I. This is due to what is believed to be the hydrogen bonding which takes place after rearrangement has occurred, which in turn gives the more efficient UV screen.

Unexpectedly, I have discovered that the latent ester stabilizer of formula I can be incorporated in the manner described previously on the surface of a polycarbonate resin such as those disclosed in Moore et al patent U.S. Pat. No. 4,198,465 issued Apr. 15, 1980 and incorporated here by reference, such as a wholly or partially cured mixture of polymethacrylate resins (which coatings can be applied in relatively thin coatings with the ester stabilizer therein) to give marked improvements in resistance to UV light. On a weight basis, the UV stabilizer of formula I can range from 0.5 to 15%, usually less than 10%, based on the weight of the carrier resin.

It was entirely unexpected and in no way could have been predicted that the UV stabilizer of formula I could function in such an effective manner as a latent stabilizer since similar compositions used in the same manner wherein the nuclearly bonded methyl group was omitted, gave significantly lower UV protection than those of formula I. Thus, when latent stabilizer compounds having the formulas:

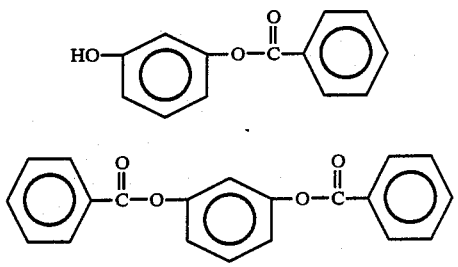

were used in place of the stabilizer of formula I, the degree of UV stabilization was markedly lower than when using the latent ester stabilizer of the instant invention.

The stabilizer of formula I employed in the practice of the present invention can be prepared by reacting one molar equivalent of methylresorcinol with at least 2 mols (e.g., from 2 to 4 mols) of benzoyl chloride in the presence of a hydrohalide acceptor such as triethylamine, pyridine, etc. Further directions for making the compound of formula I will be found in the examples which follow.

The aromatic polycarbonate resins which can be employed in the practice of the present invention are homopolymers and copolymers and mixtures thereof which have an intrinsic viscosity (I.V.) of 0.30 to 1.0 dl./g. or more as measured in methylene chloride at 25° C. and are prepared by reacting a dihydric phenol with a carbonate precursor. Typical of some of the dihydric phenols that may be employed in the practice of this invention are bisphenol-A [2,2-bis(4-hydroxyphenyl)-propane], bis(4-hydroxyphenyl)methane, 2,2-bis(4-hydroxy3-methylphenyl)propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxydiphenyl)methane, etc. Other dihydric phenols of the bisphenol type are also available and are disclosed in U.S. Pat. Nos. 2,999,835, 3,028,365 and 3,334,154.

It is, of course, possible to employ two or more different dihydric phenols for making copolymers of a dihydric phenol with a glycol or with a hydroxy or acid terminated polyester, or with a dibasic acid in the event a carbonate copolymer or inter-polymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates such as di-(chlorophenyl)carbonate, di-(bromophenyl)carbonate, di-(trichlorophenyl)carbonate, di-(tribromophenyl)carbonate, etc. di-(alkylphenyl)carbonates such as di(tolyl)carbonate, etc., di-naphthyl)carbonate, carbonate, di-(chloronaphthyl)carbonate, phenyl tolyl carbonate, chlorophenyl chloronaphthyl carbonate, etc. or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiary butylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines, such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid or their haloformyl derivatives. Also, included herein are blends of a linear polycarbonate and a branched polycarbonate.

The organic carrier resins (hereinafter identified as "carrier resin") in which the latent UV stabilizer can be incorporated include, for example, melamine resins consisting essentially of a melamine compound of the formula,

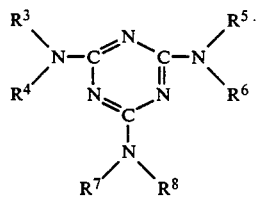

where $R^3$-$R^8$ are the same or different monovalent radicals selected from —CH$_2$OH, and —CH$_2$O(CH$_2$)$_x$H, where x is an integer of from 1 to 4 inclusive, or a mixture of such melamine compound and a polyhydroxy aromatic or aliphatic organic monomer or polymer; acrylic resins such as partially or wholly cured polymethylmethacrylate resins having a molecular weight in the range of from 5000, e.g., from 50,000 to 150,000 molecular weight, etc.; silicone resins, for example, silicones consisting essentially of chemically combined units

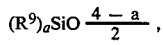

where a has an average value of about 1 to about 1.8 and $R^9$ is a member selected from vinyls (such as the

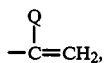

where Q is hydrogen, methyl, ethyl, phenyl, etc.) and a mixture of methyl and phenyl. Additional silicones which can be used are known by Kirk-Othmer, 2nd Edition, Vol. 18, p. 221–260 of the Encyclopedia of Chemical Technology (1969) John Wiley and Sons, New York.

The polyhydroxy compound which can be utilized in combination with the above-described melamine compound includes, for example, resorcinol, 2,2'-methylenediphenol, 2,4'-methylenediphenol, 2,4'-diisopropylidenediphenol, 4,4'-(cyclohexylidene)diphenol, and 4,4'-dihydroxydiphenyl, and 4,4'-dihydroxydiphenylsulfone. Representative aliphatic compounds are alcohols which include ethylene glycol, diethylene glycol, triethylene glycol, tetraethylene glycol, propylene glycol, 1,3-propanediol, 1,4-butanediol, 1,5-pentanediol, 1,2,3-propanetriol, pentaerythritol and sorbitol. In addition, the polyfunctional hydroxy compound can be a alkyd resin, such as hydroxyl containing epoxy resin, a soluble cellulose derivative, a vinyl polymer having free hydroxyl groups, such as poly vinyl alcohol or partial saponified poly vinyl acetate. The polyfunctional hydroxyl compound (e.g., polyol) can also contain carboxyl and amine groups but should contain at least two hydroxyl groups.

In preparing the coating compositions of the present invention for application to the thermoplastic resin substrate, the stabilizer of formula I can be blended with the carrier resin in the presence of a suitable solvent such as n-butanol, methanol and the like. In addition, a suitable acid catalyst can be employed, such as benzene sulfonic acid or sulfamic acid along with a surface active agent to assist in forming a film of the composition. There can be utilized from about 0.1 to about 3%, by weight, of the acid catalyst, while suitable surface active agents which are commercially available, for example, BYK-300 of the Mallinc-krodt Company, etc., can be utilized at about 0.1 to 1%, by weight, based on the total weight of the coating composition.

The coating compositions can be applied to a suitable thermoplastic resin substrate by conventional means such as spraying, dipping, etc. The thickness of the applied coating is not critical, but effective results can be achieved at thicknesses of between about 0.05 mil and 0.5 mil. In instances where the applied coating is a melamine resin, cure can be accomplished at a temperature between about 100° to 150° C. for a period of from about 15 minutes to 4 hours in an air oven. Under some circumstances, and depending on the carrier resin, cure can be accomplished by UV light alone without impairing the ability of the latent UV stabilizer to perform its primary ultimate function of stabilization later without inhibiting the UV cure.

In order that those skilled in the art might better understand how the present invention may be practiced, the following examples are given by way of illustration and not by way of limitation. All parts are by weight unless otherwise indicated.

EXAMPLE 1

This example illustrates the preparation of the UV stabilizer of formula I. More particularly to 30.0 grams (0.24 mole) 2-methyl resorcinol and 50 grams triethyl amine in 500 ml dry tetrahydrofuran (THF) solution was slowly added with stirring at room temperature, 57.0 grams (0.4 mole) benzoyl chloride for one hour. After removal of the triethylamine hydrochloride by filtration, the THF was evaporated to give the compound of formula I which when recrystallized from a mixture of methanol and water gave the compound of formula I whose identity was established by its method of preparation and by NMR.

EXAMPLE 2

In this example, the resorcinol dibenzoate of formula III was prepared similarly as the dibenzoate prepared in Example 1, with the exception that resorcinol itself was used instead of the 2-methyl resorcinol. Again, the identity of this compound was established by means of the preparation and also by NMR.

The resorcinol monobenzoate of formula II is a well known compound and is available from Eastman Kodak Company which identifies it as RMB. The method for preparation of this compound can also be found in the literature.

EXAMPLE 3

To determine the advantages of the ester stabilizer of formula I over comparable benzoate stabilizers in which the methyl group is absent, a 21.5 weight percent solids solution comprising a polymethyl methacrylate resin dissolved in butyl cellosolve was prepared. This polymethyl methacrylate resin containing 5%, by weight, of each of the stabilizers of formulas I, II, and III based on the weight of the polymethacrylate resin, was coated on optically clear quartz plates (which is equivalent to putting the coating on a polycarbonate sheet), heated at 125° C., for one hour, and then mounted on top of a 10 ml thick polycarbonate resin film. The samples were then irradiated under a bank of reflector sunlamps (RS), positioned about 8 inches above the samples being irradiated, which were spun slowly (about 10 revolutions per minute) on a turntable in a vented hood at 30° C. in accordance with ASTM-D-1925-70. The yellowing index (ΔYI) of the samples was periodically measured on an XL-20 Digital Tristimulus Calorimeter. The rate of photoaging of the polycarbonate samples protected by the latent UV stabilizer of formula I was greatly reduced as contrasted to the other two benzoate stabilizers where the methyl group was absent as is shown in the following Table I.

TABLE I

| Latent UV Stabilizer Formula No. | ΔYI for Polycarbonate After RS Sunlamp Exposure | | | | | | | | |
|---|---|---|---|---|---|---|---|---|---|
| | 24 hrs. | 48 hrs. | 72 hrs. | 168 hrs. | 336 hrs. | 504 hrs. | 672 hrs. | 840 hrs. | 1008 hrs. |
| I | 0.7 | 0.9 | 1.7 | 1.6 | 2.0 | 2.2 | 2.4 | 3.1 | 3.2 |
| II | 0.4 | 0.6 | 0.8 | 1.9 | 4.8 | 6.8 | 9.7 | 11.7 | 12.6 |
| III | 0.5 | 0.7 | 0.9 | 1.4 | 2.1 | 2.6 | 3.9 | 5.2 | 7.0 |

It can be seen from the data in the aforesaid Table I that when the latent ester stabilizer of formula I is used in combination with the aromatic polycarbonate resin, the resulting polycarbonate composition has considerably better resistance to UV light, as evidenced by its resistance to yellowing, even after many hundreds of hours of being subjected to a UV source.

The following table shows the rates of UV screen generation effected by the use of the compounds of formulas I, II, and III wherein the amount of UV absorption at 330 nm in the acrylic ester coating was monitored by UV spectroscopy over a period of 6 weeks. It will be noted that even though the latent UV screens of II and III were effective early in the testing period, they faded away rapidly with the passage of time while the absorption from the compound of formula I remained steady in UV screen generation as compared to that of the corresponding UV screens (compounds II and III) where the methyl group was absent, and when UV screen concentration actually began to decline.

TABLE II

| | Rates of UV Screen Generation Absorption (330 nm) Compounds of Specified Formulas | | |
|---|---|---|---|
| Weeks | I | II | III |
| 0 | 0.09 | 0.24 | 0.12 |
| 1 day | 0.15 | 0.45 | 0.21 |
| 3 days | 0.47 | 0.66 | 0.72 |
| 1 weeks | 0.50 | 0.39 | 0.66 |
| 2 weeks | 0.63 | 0.21 | 0.66 |
| 3 weeks | 0.66 | 0.12 | 0.60 |
| 4 weeks | 0.66 | 0.06 | 0.48 |
| 5 weeks | 0.66 | 0.03 | 0.39 |
| 6 weeks | 0.66 | 0.01 | 0.33 |

It will of course be apparent to those skilled in the art that in addition to the proportions of the UV stabilizer incorporated, other proportions may be used with satisfactory results. Thus, I can use from 0.5 to 10%, by weight, of the compound of formula I, based on the weight of the carrier resin.

Instead of using the polymethacrylate resin for dispersing the UV stabilizer and applying it as a thin coating on the surface of the polycarbonate resin, other resins may be used as dispersing media for the UV stabilizer, such as UV curable acrylate and methacrylate prepolymers and then applied as a thin coating over the substrate polycarbonate, which can range from 0.1 to 50 mils or more in thickness, especially when used for glazing purposes.

It will of course be apparent to those skilled in the art that in addition to the use of the specific stabilizer of formula I, it is also possible to make ester stabilizers of a more generic nature of which the compound of formula I is a species. Thus, other compounds in the class of formula I can be used where the methyl group on the resorcinol nucleus is replaced by other alkyl groups, e.g., ethyl, propyl, isobutyl, benzyl, etc. The generic ester stabilizer compounds based on formula I can be prepared similarly as was done for formula I by substituting in the appropriate place, instead of the methyl group, other alkyl groups. All other methods for preparing compounds of the generic ester stabilizers will follow those used for making the stabilizer of formula I. Also intended within the scope of the invention and claims are the use of other UV curable carrier resins, e.g., melamine resins, UV curable acrylic and methacrylic resins, and silicone resins, examples of which have been given above.

In addition to the UV curable coating compositions described above, UV coating compositions which can be converted to the cured state by UV light are included in the copending application of Daniel R. Olson and Karen K. Webb, Ser. No. 269,122, filed June 1, 1981 now U.S. Pat. No. 4,445,205 and assigned to the same assignee as the present invention. By reference, this patent is made part of the disclosures and teachings of the instant application.

I claim:

1. A polycarbonate composition of matter comprised of (1) a polycarbonate resin susceptible to degradation by ultraviolet light and (2) an effective amount of a latent UV stabilizer of the formula

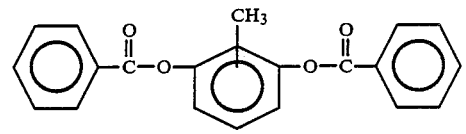

applied to the polycarbonate resin surface by means of a carrier resin which can be cured in situ, the latent UV stabilizer having the properties of permitting UV light to cure the carrier resin without interference by the latent UV stabilizer and at a later time, the carrier resin has been cured to the insoluble state, the latent stabilizer by chemical rearrangement becomes activated as a UV stabilizer for the polycarbonate resin.

2. A composition of matter comprising (1) a polycarbonate resin susceptible to degradation by ultraviolet light and (2) an effective amount of a latent UV stabilizer comprising a compound having the formula:

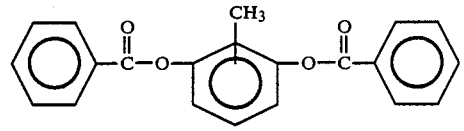

applied to the surface of the polycarbonate resin by means of a carrier resin comprising a UV curable polymethyl-methacrylate resin.

3. A composition as in claim 2 wherein the UV stabilizer is present in an amount ranging from 0.5 to 15%, by weight, based on the weight of the carrier resin.

4. A composition as in claim 2, wherein the polycarbonate resin is in the form of a film or sheet material.

5. A composition as in claim 1, wherein the carrier resin is a UV curable resin.

6. A composition as in claim 1 wherein the polycarbonate resin is protected by means of a thin coating of a cured acrylate resinous composition containing the latent UV stabilizer dispersed homogeneously throughout the thin coating, which in turn is disposed on the surface of the polycarbonate substrate.

7. A composition as in claim 1, wherein the polycarbonate resin is protected by means of a thin coating of a cured acrylate resinous composition containing the UV stabilizer dispersed homogeneously throughout the thin coating, which in turn is disposed on the surface of the polycarbonate substrate in which the amount of the UV stabilizer ranges from 0.5 to 15%, by weight, based on the weight of the acrylate resin.

8. The cured, stabilized product of claim 1.

9. The cured, stabilized product of claim 7.

* * * * *